US012151816B2

(12) United States Patent
Malecha et al.

(10) Patent No.: US 12,151,816 B2
(45) Date of Patent: Nov. 26, 2024

(54) CONSOLE MOUNTED TRAY TABLE WITH HELICAL PIVOT

(71) Applicant: B/E Aerospace, Inc., Winston-Salem, NC (US)

(72) Inventors: Jeremy F. Malecha, Pfafftown, NC (US); Travis K. Finlay, Winston-Salem, NC (US); Tracy N. Pence, King, NC (US); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 112 days.

(21) Appl. No.: 17/963,437

(22) Filed: Oct. 11, 2022

(65) Prior Publication Data

US 2024/0116636 A1  Apr. 11, 2024

(51) Int. Cl.
*B64D 11/06* (2006.01)

(52) U.S. Cl.
CPC ................ *B64D 11/0638* (2014.12)

(58) Field of Classification Search
CPC ....... B64D 11/0638; A47B 5/00; A47B 23/00; A47B 31/06
USPC ........ 297/147; 108/44, 42, 105, 95
See application file for complete search history.

(56) References Cited

U.S. PATENT DOCUMENTS

| | | | | |
|---|---|---|---|---|
| 3,648,892 A * | 3/1972 | Morgan | ..................... | A47F 5/04 211/205 |
| 3,908,565 A * | 9/1975 | Burnett | ................ | A47B 23/046 108/150 |
| 5,520,122 A * | 5/1996 | Fischer | ..................... | A47B 1/04 108/71 |
| 7,963,231 B2 * | 6/2011 | Osborne | ................ | A47B 5/006 108/42 |
| 8,359,982 B2 * | 1/2013 | Lebel | ....................... | A47B 3/00 108/7 |
| 8,528,968 B2 * | 9/2013 | Moulton | ............ | B64D 11/0605 297/147 |
| 8,596,206 B2 * | 12/2013 | Legeay | .............. | B64D 11/0604 297/145 |
| 9,776,723 B2 | 10/2017 | Gow et al. | | |

(Continued)

FOREIGN PATENT DOCUMENTS

| | | |
|---|---|---|
| DE | 19854985 A1 | 5/2000 |
| EP | 3129288 A2 | 2/2017 |
| FR | 3080070 A1 | 10/2019 |

OTHER PUBLICATIONS

Extended European Search Report dated Mar. 15, 2024; European Application No. 23203064.3.

*Primary Examiner* — Jose V Chen
(74) *Attorney, Agent, or Firm* — Suiter Swantz IP (57) ABSTRACT

A tray table assembly and a passenger seat arrangement including a tray table assembly. The tray table assembly includes a tray table coupled to a motion path element determining a motion path of the tray table between stowed and deployed positions. In embodiments, the motion path element may be implemented as at least one of a helical shaft, helical slot, and helical ramp. The motion path combines rotational and vertical motion such that an angular change of the table caused by rotational movement simultaneously causes an elevation change of the tray table. In some embodiments, the tray table may lower when rotated toward the deployed position and raise when rotated toward the stowed position.

18 Claims, 8 Drawing Sheets

(56) References Cited

U.S. PATENT DOCUMENTS

| | | | |
|---|---|---|---|
| 9,896,011 B2* | 2/2018 | Kong | B60N 3/002 |
| 10,023,315 B2* | 7/2018 | Kuyper | B64D 11/06 |
| 10,752,132 B2* | 8/2020 | Fitzpatrick | B60N 2/793 |
| 10,875,652 B2 | 12/2020 | Chuang et al. | |
| 11,072,261 B2 | 7/2021 | Gomez et al. | |
| 11,760,489 B2* | 9/2023 | Bendele | B64D 11/0605 |
| | | | 297/147 |
| 11,779,106 B2* | 10/2023 | O'Hara | A47B 5/006 |
| | | | 108/44 |
| 2010/0319588 A1* | 12/2010 | Hanna | B60N 3/001 |
| | | | 108/20 |
| 2011/0067606 A1* | 3/2011 | Sundarrao | A47C 7/705 |
| | | | 108/44 |
| 2012/0167807 A1* | 7/2012 | Legeay | B64D 11/0606 |
| | | | 108/41 |
| 2015/0284088 A1* | 10/2015 | Gow | B64D 11/0605 |
| | | | 108/44 |
| 2015/0284089 A1* | 10/2015 | Gow | B64D 11/0605 |
| | | | 297/147 |
| 2015/0284091 A1* | 10/2015 | Gow | B60N 3/004 |
| | | | 108/44 |
| 2015/0321592 A1* | 11/2015 | De Morais | B64D 11/0638 |
| | | | 297/135 |
| 2016/0376008 A1* | 12/2016 | Kuyper | B64D 11/0605 |
| | | | 244/122 R |
| 2017/0021932 A1* | 1/2017 | Marais | B64D 11/0638 |
| 2018/0127099 A1* | 5/2018 | Ducreux | B64D 11/0604 |
| 2018/0279790 A1* | 10/2018 | Pozzi | B64D 11/0638 |
| 2019/0291869 A1* | 9/2019 | Mehlos | B64D 11/0605 |
| 2020/0140091 A1 | 5/2020 | Pence | |
| 2021/0331804 A1 | 10/2021 | Frost | |
| 2022/0194284 A1* | 6/2022 | Woerz | B64D 11/0638 |
| 2022/0212585 A1* | 7/2022 | Maier | B60N 2/02246 |
| 2023/0294583 A1* | 9/2023 | Silverwood | B60N 2/62 |
| | | | 297/147 |

\* cited by examiner

CONSOLE MOUNTED TRAY TABLE WITH HELICAL PIVOT

TECHNICAL FIELD AND BACKGROUND

The present disclosure relates generally to passenger seat tray tables, and more particularly to a console mounted tray table configured to move between stowed and deployed positions along a motion path that combines vertical motion and rotational motion and while maintaining the tray table horizontal.

Vehicle passenger seats are commonly equipped with amenities for use during travel. In the case of aircraft, passenger seats are commonly equipped with tray tables, video monitors, seat controls, storage, etc., for use during flight. Regarding tray tables, to which the present disclosure is directed, most aircraft require tray tables to stow to comply with taxi-takeoff and landing (TTOL) requirements.

Tray table deployment and stowage solutions may differ depending on the seat type. In the case of economy class passenger seat rows, tray tables typically move between stowed and deployed positions along a motion path that includes rotational motion. For example, tray tables may be attached to support arms configured to rotate the tray table into position for use and stow the tray table against a forward seat back during TTOL. Some economy class tray table solutions may also include linear motion to reposition the tray table after the tray table has been rotated into the deployed position.

Stowage and deployment solutions for business and premium class seats may differ depending on the seat surroundings. For example, passenger seats positioned away from furniture may include a tray table that deploys from within an armrest. Armrest deployment solutions typically utilize a multi-axis hinge that allows movement along a motion path that includes a first rotational motion to rotate the tray table from within the armrest followed by a second rotational motion to rotate the tray table to an over-seat position, wherein the rotations are performed sequentially, and the rotational axes are perpendicular. In another example, passenger seats positioned near furniture such as a desk may include a tray table that deploys from a forward positioned along a guideway. In such an example, the motion path includes linear motion to move the tray table between stowed and deployed.

Conventional under desk tray table solutions may be undesirable in some passenger seat and passenger suite configurations. For example, when stowed, the tray table may consume a portion of the living space of the passenger and may influence the seat adjustment and seat position relative to the desk, particularly when considering a seat adjustable to a horizontal bed.

Therefore, what is needed is a tray table deployment and stowage solution that overcomes the disadvantages of prior art solutions, and particularly the disadvantages of desk-mounted tray table solutions.

BRIEF SUMMARY

In one aspect, the present disclosure provides a passenger seat arrangement including a passenger seat, a footwell positioned generally forward of the passenger seat, a shelf positioned over the footwell, a console positioned generally to one side of the passenger seat, and a tray table. The tray table is movable along a motion path between a stowed position within the footwell and a deployed position outside of the footwell through at least one intermediate position, wherein the motion path includes combined rotational motion and vertical motion, and wherein the tray table remains generally horizontal through a full range of motion along the motion path.

In some embodiments, the elevation of the tray table is greater when in the stowed position than when in the deployed position.

In some embodiments, the change in the elevation between the stowed position and the deployed position of the tray table is from about 1 inch to about 3 inches.

In some embodiments, the change in angle of the tray table between the stowed position and the deployed position is from about 40 degrees to about 90 degrees, more preferably about 50 degrees to about 70 degrees, and in some embodiments about 60 degrees.

In some embodiments, the rotational motion and the vertical motion occur simultaneously along the full range of motion along the motion path.

In some embodiments, the motion path is determined by a motion path element including a vertical helical shaft positioned in the console, the vertical helical shaft determining at least a portion of the motion path of the tray table. The tray table may be mounted on a support arm rotationally coupled at one end to the vertical helical shaft such that motion of the support arm relative to the vertical helical shaft moves the tray table along the motion path.

In some embodiments, the motion path is determined by a motion path element including a vertical shaft positioned in the console and a helical ramp positioned in the footwell, the helical ramp determining at least a portion of the motion path of the tray table. The tray table may be mounted on a support arm rotationally coupled at one end to the vertical shaft and an end of the tray table opposite the vertical shaft may engage and travel along the helical ramp. The vertical shaft may or may not be a helical shaft.

In some embodiments, the motion path is determined by a vertical shaft positioned in the console and defining a helical slot determining at least a portion of the motion path of the tray table. The tray table may be mounted on a support arm rotationally coupled at one end to the vertical shaft such that a portion of the support arm extends through the helical slot and the motion of the support arm relative to the helical slot moves the tray table along the motion path.

In another aspect, the present disclosure provides a tray table assembly including a tray table movable along a motion path between a stowed position and a deployed position through at least one intermediate position, and a motion path element defining at least a portion of the motion path. The motion path includes combined rotational motion and vertical motion and the tray table preferably remains generally horizontal through a full range of motion along the motion path. In some embodiments, the elevation of the tray table is greater when in the stowed position than when in the deployed position and a change in angle of the tray table between the stowed position and the deployed position is from about 40 degrees to about 90 degrees.

In some embodiments, the motion path element may be at least one of a vertical helical shaft, a helical ramp, and a vertical shaft defining a helical slot.

In some embodiments, the tray table includes a first portion and a second portion rotationally coupled to the first portion, wherein the second portion is configured to fold atop the first portion. In some embodiments, the tray table is folded before stowing to reduce the tray table surface area.

This brief summary is provided solely as an introduction to subject matter that is fully described in the detailed description and drawings below. This brief summary should not be considered to describe essential features nor be used to determine the scope of the claims. Moreover, it is to be understood that both the foregoing brief summary and the following detailed description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides embodiments of tray tables and elements for determining and/or controlling tray table motion path. The tray table embodiments discussed herein may be utilized in passenger seat configurations including, but not limited to, business class passenger seats, premium class passenger seats, and passenger suites on aircraft, other passenger conveyances, and elsewhere benefitting from such tray table configurations. The tray table motion paths discussed herein include combinations of rotational motion and vertical motion, preferably simultaneously, such that as the tray table rotates (i.e., changes in angle relative to a seat, console, or other fixture) the tray table also undergoes an elevation change. In some embodiments, the motion path may originate or end with a singular motion type such as rotational motion without vertical motion or vice versa. As such, the combination motion determines the elevation change of the tray table whereas the singular motion may be used, for example, for angular adjustment when fully stowed or fully deployed.

Figure 1:
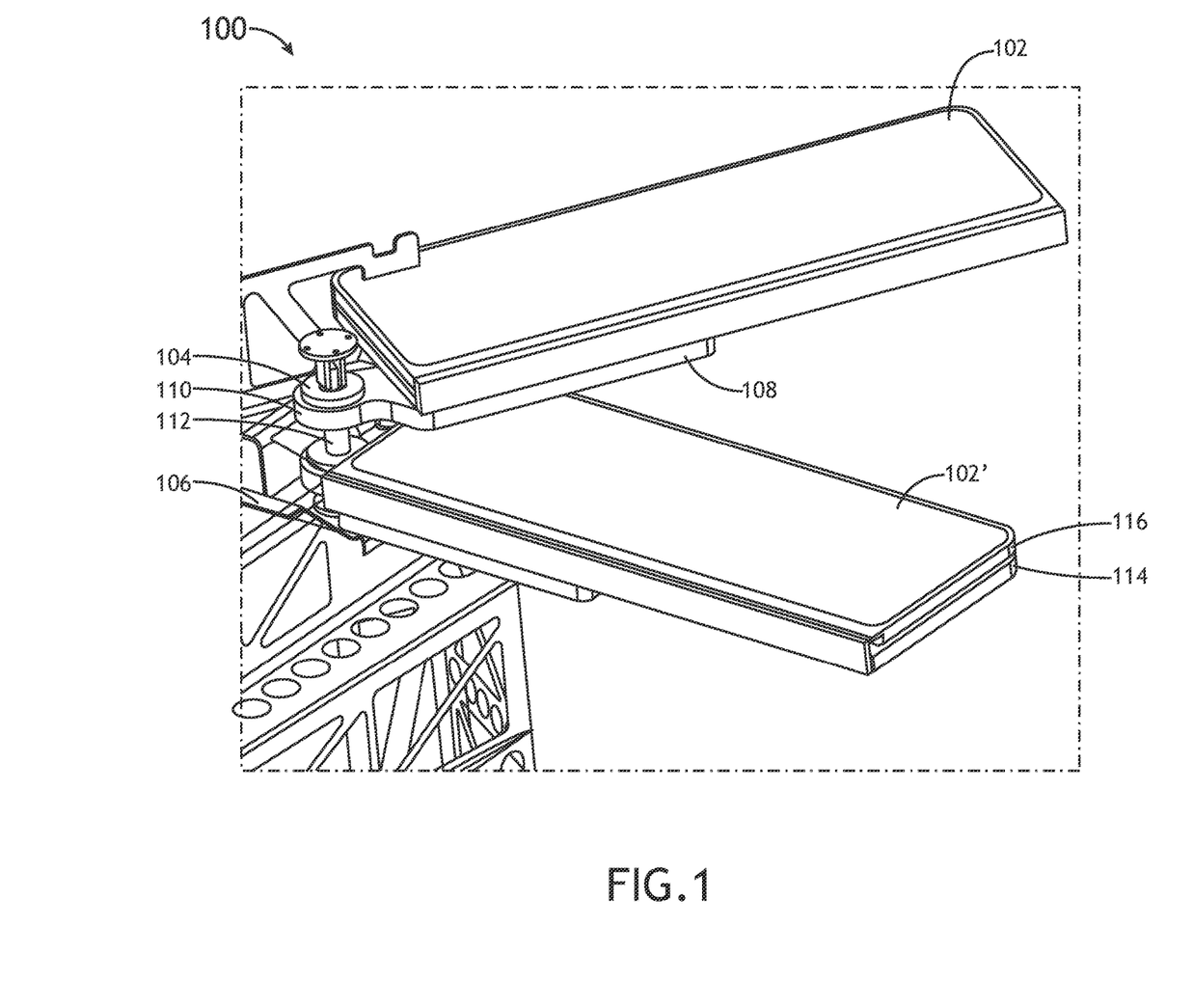
FIG. 1 is a perspective view of a tray table assembly showing a motion path element and stowed and deployed positions of the tray table in accordance with an embodiment of this disclosure.

FIG. 1 shows a tray table assembly 100 according to a first embodiment of the present disclosure. The tray table assembly 100 generally includes a tray table 102 coupled to a motion path element 104. As shown, the motion path element 104 is positioned relative to a console 106, for instance a console positioned generally to one side of a passenger seat. The term console as used herein refers to any furniture, monument, fixture, wall, trim, or the like positioned adjacent a passenger seat and to which the motion path element can be housed, mounted, supported, or otherwise attached. In some embodiments, the console 106 serves a single passenger seat. In other embodiments, the console 106 may be shared by two or more seats. In a particular embodiment, the console 106 is positioned generally to one side of a passenger seat in an aircraft.

The tray table 102 is mounted to a support arm 108, such as mounted atop the support arm 108. One end of the support arm 108 extends laterally outward beyond a lateral side of the tray table 102 and forms an annular collar 110 circumferentially surrounding a shaft 112 of the motion path element 104. The opposing lateral side of the tray table 102 is detached. The support arm 108 may be a unitary construction or may include two or more attached parts. The tray table 102 as shown includes a first table part 114 and a second table part 116 hinged to the first table part to allow the second table part to be folded on the first table part to reduce the tray table size, for instance to facilitate stowing. In some embodiments, the first and second parts 114, 116 are substantially equal size halves that together form a whole. In other embodiments, the tray table may include one part defining the usable table surface area. Tray table hinges may be piano hinges, living hinges and any other conventional hinge device mechanism permitting the desired folding capability. In other embodiments, the tray table 102 may include more than two parts configured to form the table surface area. Although not shown, at least one of the tray table parts may form at least one of a cupholder and an electronic device holder.

In some embodiments, the shaft 112 is a vertically oriented helical shaft, also referred to herein as a "vertical helical shaft" or simply a "helical shaft." The helical shaft 112 is disposed in the console 106 positioned along a side of the console closest the passenger seat (not shown). In this configuration, the motion path of the tray table 102 is between a stowed position and a deployed position through at least one intermediate position. As shown in FIG. 1, the "top" tray table 102 illustrates the stowed tray table position and the "bottom" tray table 102' illustrates the deployed tray table position. The at least one intermediate is anywhere between the fully stowed tray table position and the fully deployed tray table position.

As apparent in FIG. 1, the tray table 102 undergoes an angular change between the stowed and deployed positions. In some embodiments, the full range of motion between stowed and deployed is about 40 degrees to about 90 degrees, more preferably about 50 degrees to about 80 degrees, and even more preferably about 60 degrees. The range of motion is not limited to the foregoing and in some embodiments may be a full 360-degree range of motion. As discussed further below, the stowed tray table position corresponds to an out-of-use position for seat egress, while the deployed tray table position corresponds to an in-use over seat position, for instance in which the lateral tray table axis is substantially perpendicular to the longitudinal seat axis.

Further apparent in FIG. 1 is the change in tray table elevation between the stowed and deployed positions. As shown, the tray table elevation is greater in the stowed position as compared to the deployed position. In some embodiments, the tray table gradually raises as it moves along the motion path toward the stowed position and gradually lowers as it moves along the motion path toward the deployed position. In some embodiments, the elevation change is from about 0.5 inches to about 6 inches (i.e., from about 1.25 cm to about 15.25 cm), more preferably from about 1 inch to about 4 inches (i.e., from about 2.5 cm to about 10.1 cm), and even more preferably from about 1 inch to about 3 inches (i.e., from about 2.5 cm to about 7.6 cm). Different elevation ranges are possible and envisioned, and any of the aforementioned elevation ranges may be combined with any of the above-mentioned angular ranges to provide a customized motion path.

With continued reference to FIG. 1, the tray table motion path therefore includes a combination of rotational motion and vertical motion, wherein the elevation change occurs simultaneously with the angular change. More particularly, in some embodiments the tray table 102 lowers as it angles toward the deployed position and raises as it angles toward the stowed position, or vice versa. The motion path is controlled or determined by the interaction of the helical shaft 112 and the annular feature of the support arm 108. In some embodiments, the helical shaft 112 includes an external helically splined portion 116 and the annular feature includes an internal helically splined portion. The two helically splined portions interact such that rotational motion of the support arm 108 in a first direction around the shaft 112 raises the support arm, thereby lifting the tray table 102, and rotational motion of the support arm 108 around the shaft 112 in a second direction opposite the first direction lowers the support arm, thereby lowering the tray table 102. The steepness of the splining may be adjusted to achieve the desired combination of rotational and vertical motion.

Finally apparent in FIG. 1 is that the tray table 102 is maintained substantially horizontal through the entire range of motion of the tray table. As such, in each of the deployed and at least one intermediate position the tray table plane is maintained constant. This permits the passenger to move the tray table from the fully deployed position to an intermediate position, for example for seat egress, without having to remove items from the tabletop. This also allows the passenger to position the table as desired along the motion path.

Figure 2:
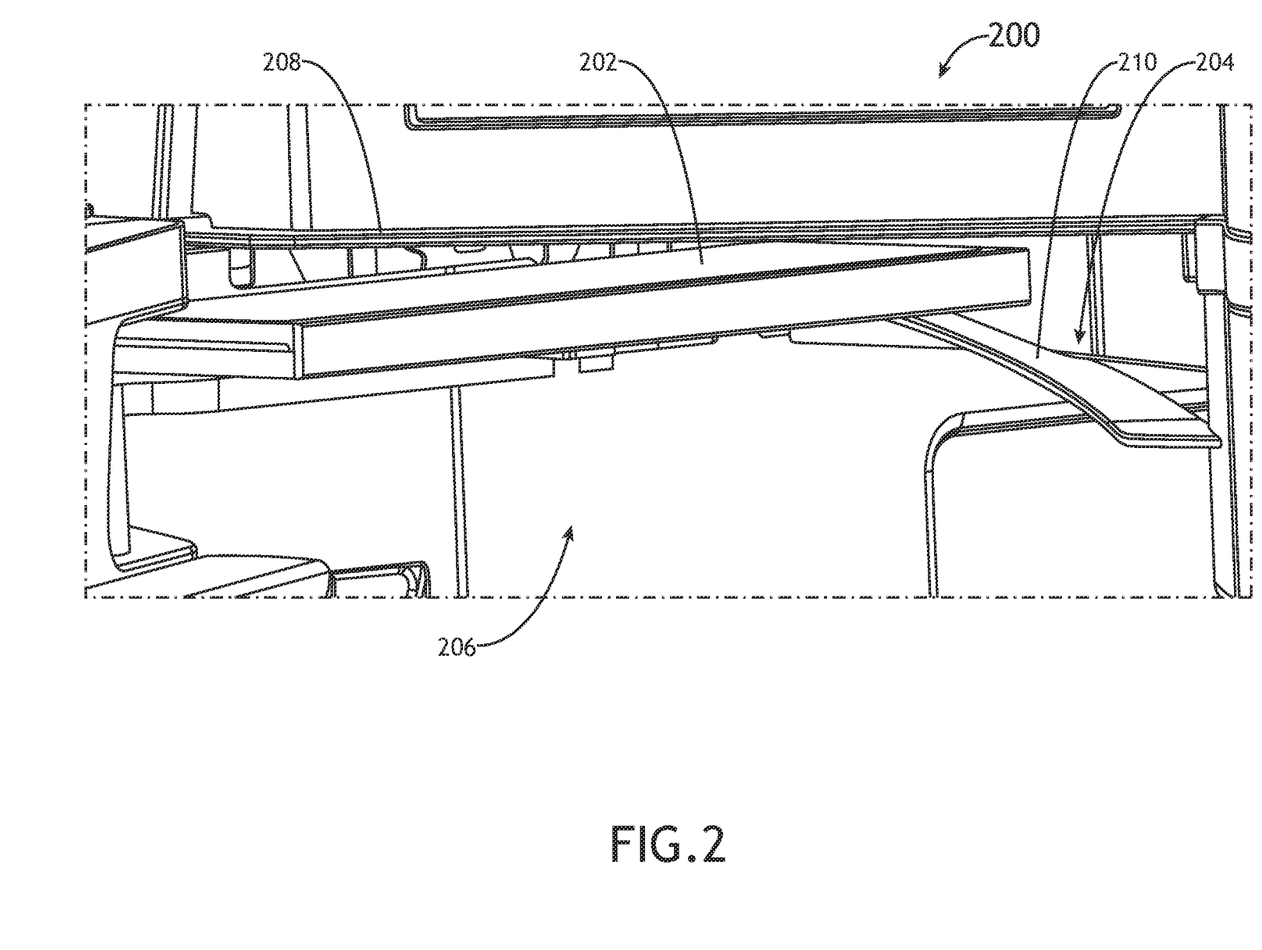
FIG. 2 is a perspective view of a portion of a passenger seat arrangement including a deployable tray table shown in a stowed position in accordance with an embodiment of this disclosure.
Figure 3:
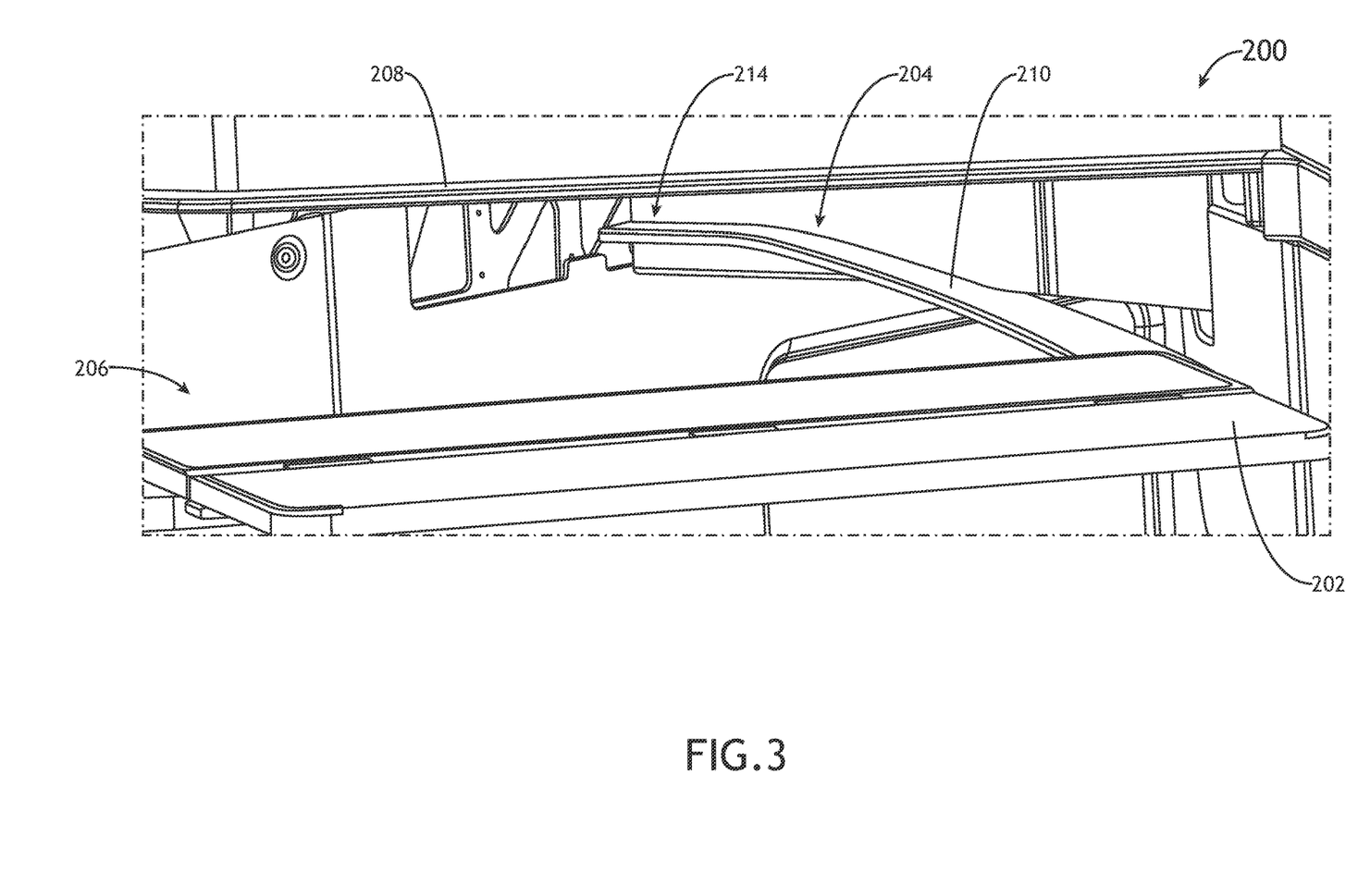
FIG. 3 is a perspective view of the passenger seat arrangement of FIG. 2 showing the tray table in a deployed position.

FIGS. 2 and 3 show a tray table assembly according to a second embodiment of the present disclosure installed in a passenger seat arrangement. The tray table assembly generally includes a tray table 202 coupled to a motion path element 204. The motion path element 204 is positioned in a footwell 206. In some embodiments, the footwell 206 is positioned below a shelf 208. As used herein, the term shelf refers to any element positioned over or above the footwell, such as a desk, table, etc. As shown, the shelf 208 supports a video monitor or other item positioned forward of a passenger seat.

The motion path element 204 shown is implemented as a helical ramp 210. The helical ramp 210 is positioned inside the footwell 206. A first end of the helical ramp 210 is shown generally at reference numeral 212 and corresponds to the deployed position of the tray table 202. A second end of the helical ramp 210 is shown generally at reference numeral 214 and corresponds to the stowed position of the tray table 202. In some embodiments, the second end 214 may transition to into a horizontal portion and the fully stowed tray table may sit on the horizontal portion to maintain the stowed position.

In some embodiments, the first end 212 corresponds to an entrance onto the helical ramp 210 when the tray table 202 is fully deployed, and the first end 214 further corresponds to an exit off of the helical ramp 210 as the tray table moves toward fully deployed. In some embodiments, the length of the helical ramp 210 is such that the tray table 202 never loses contact with the ramp, thereby supporting the tray table 202 along its detached lateral side. In some embodiments, the helical ramp 210 is generally positioned along one side and the back of the footwell. Comparing FIGS. 2 and 3 it is apparent that raising the tray table when stowing preserves footwell space and moves the tray table out of the way of seat adjustment, for instance leg rest extension into the footwell.

Figure 4:
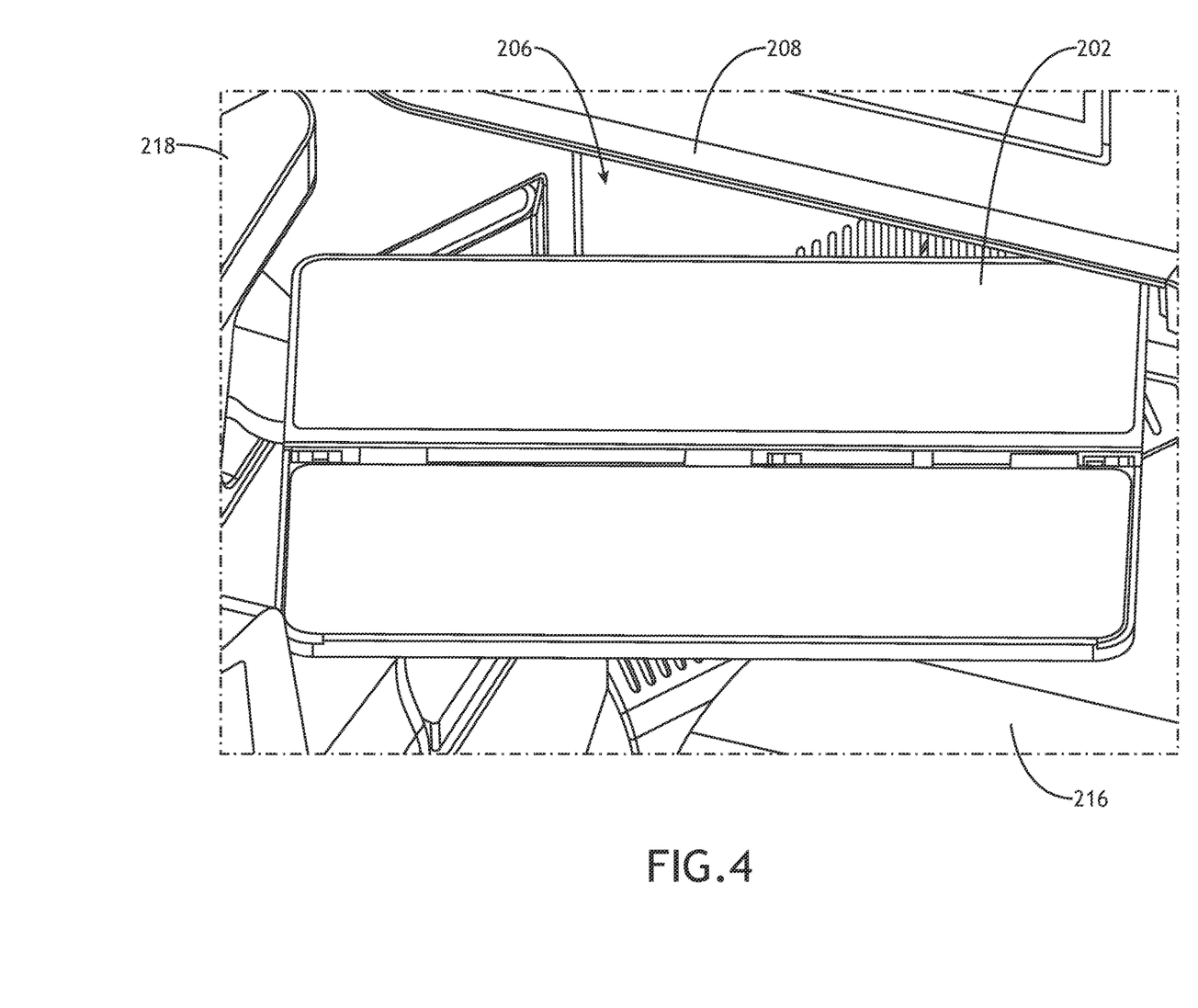
FIG. 4 is a perspective view of the passenger seat arrangement of FIG. 2 showing the tray table in an intermediate position.

FIG. 4 shows the tray table 202 in an intermediate position over a portion of the passenger seat 216 served by the tray table. The tray table 202 is further shown unfolded as discussed above. FIG. 4 further shows a portion of the console 218 positioned generally to one side of the passenger seat 216 and the shelf 208 positioned generally forward of the passenger seat 216 and over the footwell 206. In this seat arrangement, the tray table 202, by way of the motion path element 204, is movable through a full range of motion between the stowed position within the footwell and clear of the passenger seat and the deployed position out of the footwell and positioned over the passenger seat, for instance positioned over the seat bottom.

Figure 5:
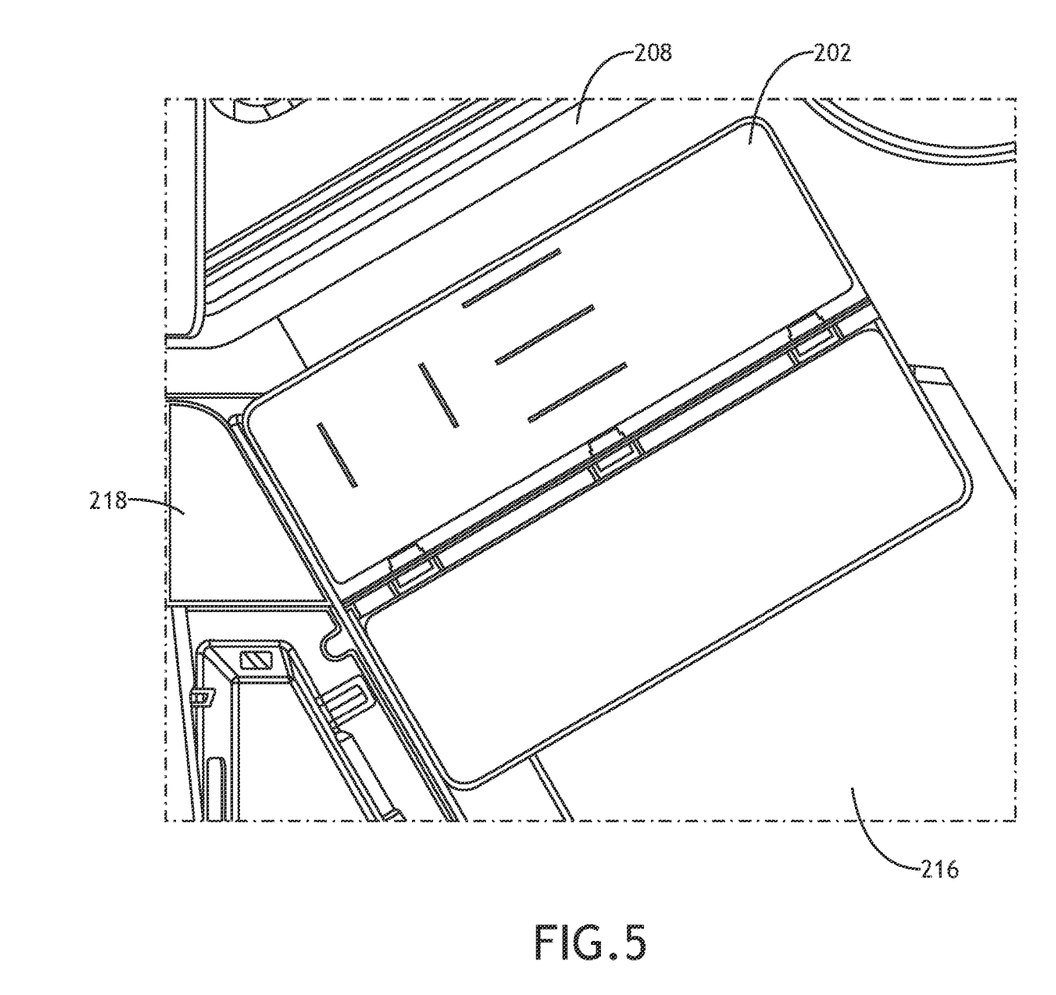
FIG. 5 is a top perspective view of a portion of the passenger seat arrangement of FIG. 2 showing the tray table in the deployed position.

FIG. 5 shows the tray table 202 fully deployed and unfolded such that the lateral table axis and the longitudinal seat axis are perpendicular. FIG. 5 further shows the positional relationship of the passenger seat 216 relative to the console 218, the passenger seat 216 relative to the shelf 208, the console 218 relative to the shelf, and the tray table 202 when deployed relative to each of the passenger seat 216, console 218 and shelf 208. The range of motion of the tray table 202 may be customized depending on the positional relationships of at least these items positioned in the passenger seat area.

Figure 6:
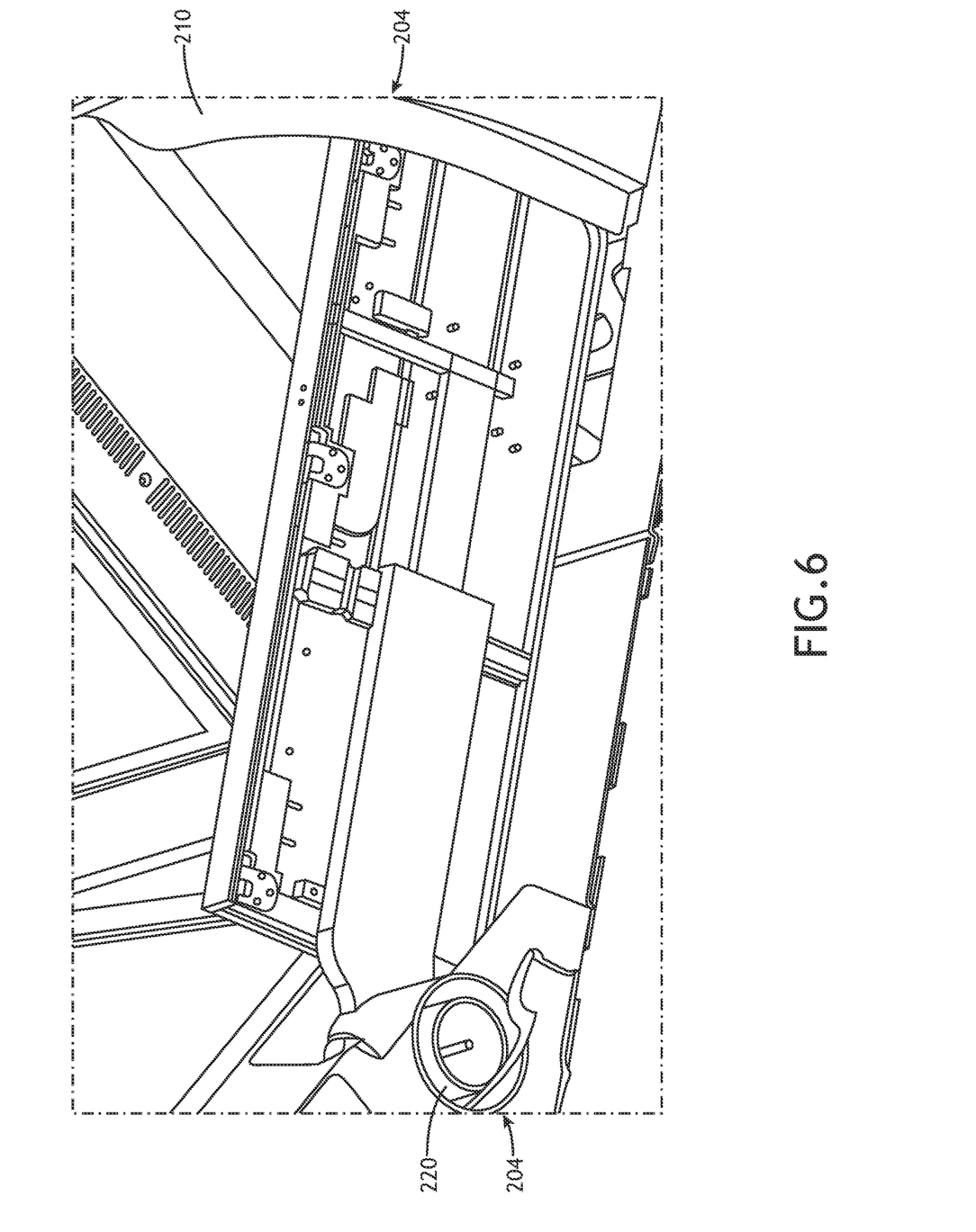
FIG. 6 is a bottom perspective view of the passenger seat arrangement of FIG. 2 showing the tray table in the stowed position.
Figure 7:
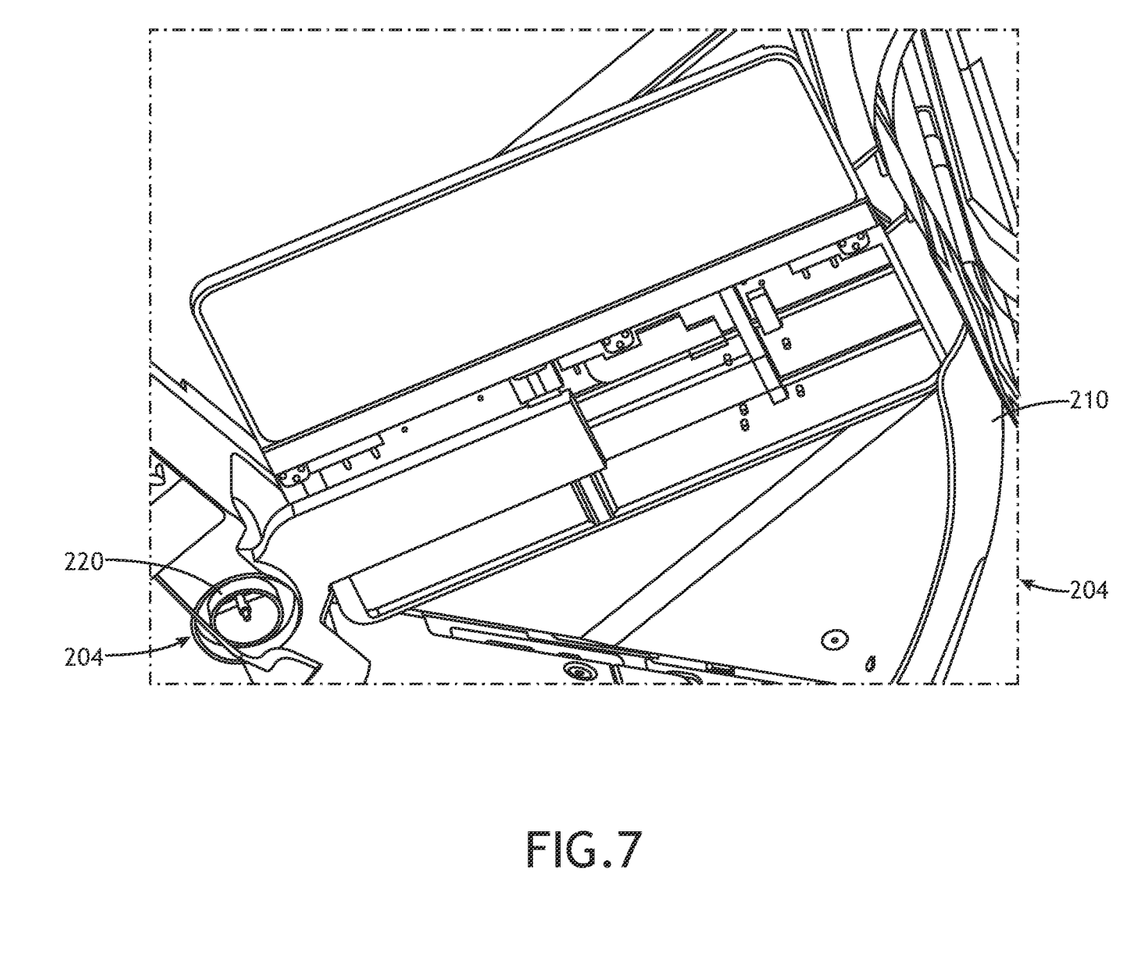
FIG. 7 is a bottom perspective view of the passenger seat arrangement of FIG. 2 showing the tray table in the deployed position.

FIGS. 6 and 7 show the tray table assembly from below to illustrate support arm attachment and latching and hinge mechanisms of the tray table which are not critical to this invention and may be conventional. FIGS. 6 and 7 further illustrate the motion path element 204. In some embodiments, the motion path element 204 includes the helical ramp 210 as discussed above as well as a helical shaft shown generally at reference numeral 220. In some embodiments, the helical shaft may be implemented as the external helically splined shaft as discussed above such that the internal helically splined support arm end interacts with the shaft.

The ratio of angular change to elevation change may be matched for each of the shaft 220 and helical ramp 220 such that the movement of the tray table 202 is coordinated. In some embodiments, the shaft 220 may include a helical slot driving elevation change as the support arm rotates. In some embodiments, the shaft 220 may be a smooth shaft and the support arm end smooth to match to facilitate vertical sliding as the opposite table side slides along the helical ramp.

Figure 8:
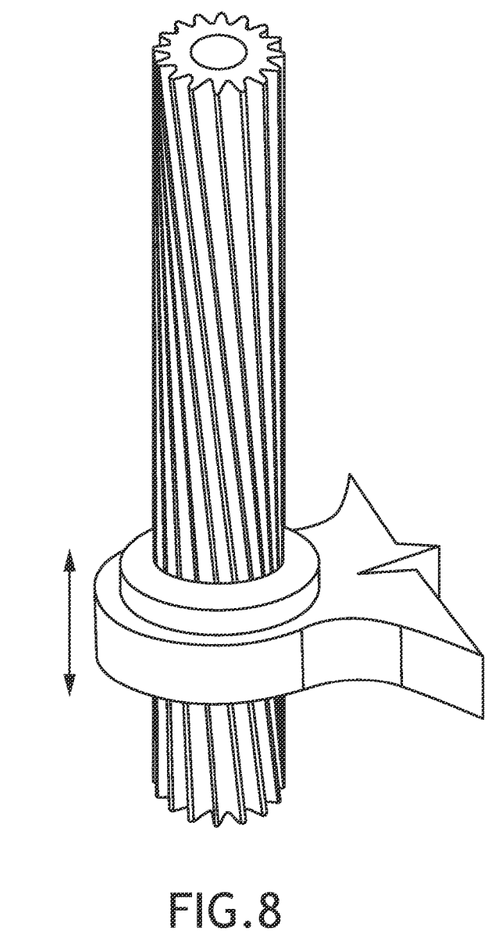
FIG. 8 illustrates a helical shaft shaped to determine a tray table motion path, in accordance with an embodiment of this disclosure.

FIG. 8 shows a non-limiting example of the helical shaft including an external helically splined portion determining the motion path. In embodiments, the support arm end collar is internally helically splined and circumferentially surrounds the shaft. In use, rotational movement of the support arm relative to the shaft, caused by pushing or pulling on the tray table or directly on the support arm, simultaneously causes vertical motion of the support arm as the helical splines interact.

Figure 9:
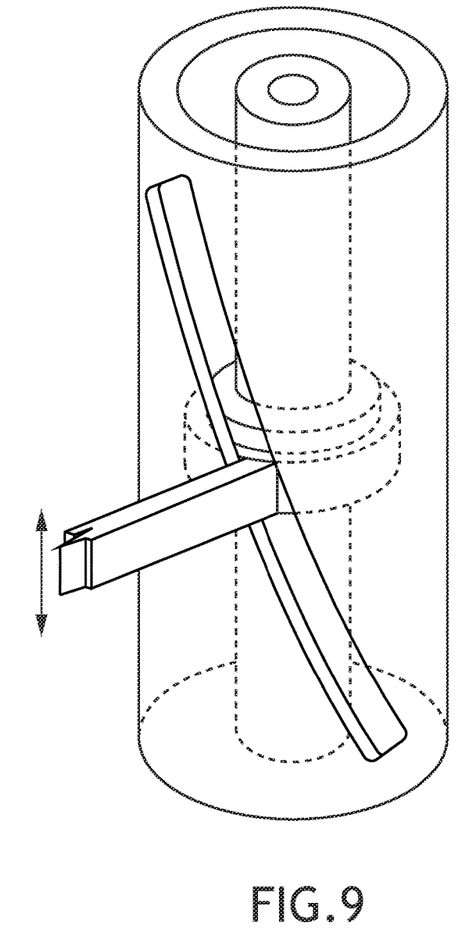
FIG. 9 illustrates a shaft including a helical slot shaped to determining a tray table motion path, in accordance with an embodiment of this disclosure.

FIG. 9 shows a non-limiting example of a shaft including a circumferential helical slot. A portion of the support arm extends through the helical slot. In use, rotational movement of the support arm relative to the helical slot, caused by pushing or pulling on the tray table or directly on the support arm, simultaneously causes vertical motion of the support arm as the support arm and the helical slot interact.

Although not shown, the tray table embodiments disclosed herein are compatible for use with lift assist mechanisms, for example gas spring, to reduce the weight and tray table and facilitate motion along the motion path.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A passenger seat arrangement, comprising:
a passenger seat;
a footwell positioned generally forward of the passenger seat;
a shelf positioned over the footwell;
a console positioned generally to one side of the passenger seat; and
a tray table movable along a motion path between a stowed position within the footwell and a deployed position outside of the footwell through at least one intermediate position, wherein the motion path includes combined rotational motion and vertical motion, wherein the tray table remains generally horizontal through a full range of motion along the motion path, and wherein an elevation of the tray table is greater when in the stowed position than when in the deployed position.

2. The passenger seat arrangement according to claim 1, wherein a change in the elevation between the stowed position and the deployed position of the tray table is from about 1 inch to about 3 inches.

3. The passenger seat arrangement according to claim 1, wherein a change in angle of the tray table between the stowed position and the deployed position is from about 40 degrees to about 90 degrees.

4. The passenger seat arrangement according to claim 1, wherein the rotational motion and the vertical motion occur simultaneously along the full range of motion along the motion path.

5. The passenger seat arrangement according to claim 1, further comprising:
a vertical helical shaft positioned in the console, the vertical helical shaft determining at least a portion of the motion path of the tray table;
wherein the tray table is mounted on a support arm rotationally coupled at one end to the vertical helical shaft; and
wherein motion of the support arm relative to the vertical helical shaft moves the tray table along the motion path.

6. The passenger seat arrangement according to claim 1, further comprising:
a vertical shaft positioned in the console; and
a helical ramp positioned in the footwell, the helical ramp determining at least a portion of the motion path of the tray table;
wherein the tray table is mounted on a support arm rotationally coupled at one end to the vertical shaft; and
wherein an end of the tray table opposite the vertical shaft engages and travels along the helical ramp.

7. The passenger seat arrangement according to claim 6, wherein the vertical shaft is a helical shaft.

8. The passenger seat arrangement according to claim 1, further comprising:

a vertical shaft positioned in the console, the vertical shaft including a helical slot determining at least a portion of the motion path of the tray table;

wherein the tray table is mounted on a support arm rotationally coupled at one end to the vertical shaft;

wherein a portion of the support arm extends through the helical slot; and wherein motion of the support arm relative to the helical slot moves the tray table along the motion path.

9. A tray table assembly, comprising:
a tray table movable along a motion path between a stowed position and a deployed position through at least one intermediate position; and
a motion path element defining at least a portion of the motion path;
wherein:
the motion path includes combined rotational motion and vertical motion;
the tray table remains generally horizontal through a full range of motion along the motion path;
an elevation of the tray table is greater when in the stowed position than when in the deployed position; and
a change in angle of the tray table between the stowed position and the deployed position is from about 40 degrees to about 90 degrees.

10. The tray table assembly according to claim 9, wherein:
the motion path element is a vertical helical shaft;
the tray table is mounted on a support arm rotationally coupled at one end to the vertical helical shaft; and
motion of the support arm relative to the vertical helical shaft moves the tray table along the motion path.

11. The tray table assembly according to claim 9, wherein:
the motion path element includes a vertical shaft and a helical ramp;
the tray table is mounted on a support arm rotationally coupled at one end to the vertical shaft; and
an end of the tray table opposite the vertical shaft engages and travels along the helical ramp.

12. The tray table assembly according to claim 11, wherein the vertical shaft is a helical shaft.

13. The tray table assembly according to claim 9, wherein:
the motion path element is vertical shaft defining a helical slot;
the tray table is mounted on a support arm rotationally coupled at one end to the vertical shaft;
a portion of the support arm extends through the helical slot; and
motion of the support arm relative to the helical slot moves the tray table along the motion path.

14. The tray table assembly according to claim 9, wherein the tray table comprises a first portion and a second portion rotationally coupled to the first portion, and wherein the second portion is configured to fold atop the first portion.

15. A passenger seat arrangement, comprising:
a passenger seat;
a footwell positioned generally forward of the passenger seat;
a shelf positioned over the footwell;
a console positioned generally to one side of the passenger seat; and
a tray table movable along a motion path between a stowed position within the footwell and a deployed position outside of the footwell through at least one intermediate position;
wherein:
the motion path includes combined rotational motion and vertical motion;
a vertical helical shaft is positioned in the console and determines at least a portion of the motion path of the tray table;
the tray table is mounted on a support arm rotationally coupled at one end to the vertical helical shaft;
motion of the support arm relative to the vertical helical shaft moves the tray table along the motion path; and
wherein an elevation of the tray table is greater when in the stowed position than when in the deployed position.

16. The passenger seat arrangement according to claim 15, further comprising a helical ramp positioned in the footwell, the helical ramp determining at least a portion of the motion path of the tray table, and wherein an end of the tray table opposite the vertical shaft engages and travels along the helical ramp.

17. The passenger seat arrangement according to claim 15, wherein a change in the elevation between the stowed position and the deployed position of the tray table is from about 1 inch to about 3 inches.

18. The passenger seat arrangement according to claim 15, wherein a change in angle of the tray table between the stowed position and the deployed position is from about 40 degrees to about 90 degrees.

* * * * *